United States Patent
Park

(10) Patent No.: US 9,360,734 B2
(45) Date of Patent: Jun. 7, 2016

(54) VERTICAL WIRE ABSORBING STRUCTURE OF COMPACT CAMERA MODULE

(75) Inventor: Chang Wook Park, Ansan-si (KR)

(73) Assignee: HYSONIC. CO., LTD. (KR)

( * ) Notice: Subject to any disclaimer, the term of this patent is extended or adjusted under 35 U.S.C. 154(b) by 131 days.

(21) Appl. No.: 14/402,502

(22) PCT Filed: Jul. 18, 2012

(86) PCT No.: PCT/KR2012/005741
§ 371 (c)(1),
(2), (4) Date: Nov. 20, 2014

(87) PCT Pub. No.: WO2013/042865
PCT Pub. Date: Mar. 28, 2013

(65) Prior Publication Data
US 2015/0286109 A1    Oct. 8, 2015

(30) Foreign Application Priority Data

Sep. 23, 2011  (KR) ................. 10-2011-0096068
Sep. 23, 2011  (KR) ................. 10-2011-0096071
Jan. 13, 2012  (KR) ................. 10-2012-0004430

(51) Int. Cl.
| G03B 17/00 | (2006.01) |
| G03B 3/02  | (2006.01) |
| G03B 5/00  | (2006.01) |
| G03B 17/02 | (2006.01) |
| H04N 5/225 | (2006.01) |

(52) U.S. Cl.
CPC .. G03B 3/02 (2013.01); G03B 5/00 (2013.01); G03B 17/02 (2013.01); H04N 5/2257 (2013.01)

(58) Field of Classification Search
USPC ........... 396/529, 535, 541, 52, 55; 348/208.2, 348/208.99
See application file for complete search history.

(56) References Cited

U.S. PATENT DOCUMENTS

| 5,717,960 A | 2/1998 | Tomita et al. |
| 6,091,900 A * | 7/2000 | Kaneda ................ G02B 27/646 348/208.11 |
| 7,161,621 B2 | 1/2007 | Kai et al. |
| 7,944,629 B2 * | 5/2011 | Shin ....................... G02B 7/023 359/811 |
| 2006/0219862 A1 * | 10/2006 | Ho .................... H01L 27/14618 250/208.1 |

(Continued)

FOREIGN PATENT DOCUMENTS

| JP | 09073111 | 3/1997 |
| JP | 2002207148 | 7/2002 |

(Continued)

OTHER PUBLICATIONS

International Search Report—PCT/KR2012/005741 dated Feb. 13, 2013.

*Primary Examiner* — Clayton E Laballe
*Assistant Examiner* — Warren K Fenwick
(74) *Attorney, Agent, or Firm* — Cantor Colburn LLP

(57) ABSTRACT

A vertical wire absorbing structure of a compact camera module is disclosed. The vertical wire absorbing structure of a compact camera module absorbs an impact applied to a wire spring for coupling a lens holder and a spacer when a lens holder for, when a camera is severely shaken or a lens holder for correcting the shaking or automatically adjusting a focus of the camera is moved, correcting the shaking or automatically adjusting a focus of a lens due to an absorber disposed on or under a spacer.

24 Claims, 16 Drawing Sheets

(56) References Cited

U.S. PATENT DOCUMENTS

| | | | |
|---|---|---|---|
| 2007/0154198 A1* | 7/2007 | Oh | G02B 7/102 396/85 |
| 2011/0096178 A1* | 4/2011 | Ryu | H04N 5/2252 348/208.2 |
| 2013/0343737 A1* | 12/2013 | Ryu | H04N 5/2252 396/55 |
| 2013/0343738 A1* | 12/2013 | Ryu | H04N 5/2252 396/55 |

FOREIGN PATENT DOCUMENTS

| | | |
|---|---|---|
| KR | 100952620 | 4/2010 |
| KR | 1020100093263 | 8/2010 |

* cited by examiner (a)

(b)

(a)

(b)

(a)

(b)

(a)

(b)

(c)

VERTICAL WIRE ABSORBING STRUCTURE OF COMPACT CAMERA MODULE

TECHNICAL FIELD

The present invention relates to a vertical wire absorbing structure of a compact camera module, and more particularly to a vertical wire absorbing structure of a compact camera module which can absorb an impact applied to a wire spring connected to a camera lens when a camera module is shaken.

BACKGROUND ART

A compact camera module moves a location of a lens holder to which a lens is mounted to correct shaking of an image due to shaking of a hand of a user or automatically adjust a focus of the lens when a subject is captured.

Such a compact camera module is disclosed in Korean Patent No. 10-0952620 filed and registered by the applicant of the present invention.

FIG. 1 is a longitudinal sectional view of a compact camera module according to the related art.

As shown in FIG. 1, the compact camera module according to the related art includes a lens holder 120, a spacer 130, a circuit board 160, a wire spring 140, and a driving unit.

A camera lens is mounted to an inside of the lens holder 120.

The spacer 130 is disposed on the lens holder 120.

The circuit board 160 is disposed on the spacer 130.

An upper end of the wire spring 140 is coupled to the spacer 130 to be connected to the circuit board 160, and a lower end of the wire spring 140 is mounted to the lens holder 120.

The driving unit receives electric power through the wire spring 140 and horizontally moves the lens holder 120 to correct shaking of an image of a subject captured by the camera.

However, when the camera is severely shaken and a vertical impact occurs in the wire spring 140 in the camera module according to the related art, an impact is directly transferred to an end of the wire spring 140 so that connecting portions of the circuit board 160 and the wire spring 140 may be damaged and separated when the camera module is used for a long time.

In addition, if the camera module according to the related art includes a structure for realizing an automatic focus adjusting function, an impact is transferred to the wire spring while the lens holder is moved for a long time so that the connecting portions of the circuit board and the wire spring may be damaged and separated.

DISCLOSURE

Technical Problem

The present invention has been made in an effort to solve the above-mentioned problems, and provides a vertical wire absorbing structure of a compact camera module which, when a camera is severely shaken or a lens holder for correcting the shaking or automatically adjusting a focus of the camera is moved, can minimize an impact occurring in a wire spring connected to a circuit board and the lens holder from being concentrated on opposite end of the wire spring, thereby preventing the wire spring coupled to the circuit board and the lens holder from being separated.

Technical Solution

In accordance with an aspect of the present invention, there is provided A vertical wire absorbing structure of a compact camera module, including: a lens holder to which a camera lens is mounted; a spacer disposed on the lens holder; a flexible printed circuit board disposed on the spacer; a wire spring coupling the lens holder to the spacer such that the lens holder is horizontally moved with respect to the spacer; and n absorber disposed on or under the spacer, wherein the absorber absorbs an impact applied to the wire spring.

The absorber is disposed between the spacer and the flexible printed circuit board, one end of the wire spring passes through the spacer and the absorber to be connected to the flexible printed circuit board and an opposite end of the wire spring is fixedly mounted to the lens holder, and coupling holes through which one end of the wire spring passes to be inserted into the coupling holes are formed in the spacer, the absorber, and the flexible printed circuit board.

An insertion groove communicated with the coupling holes is formed at an upper portion of the spacer, and the absorber is inserted into the insertion groove.

A metal terminal contacting the wire spring inserted into the coupling hole is formed in the flexible printed circuit board, and a maximum distance (L1) between the center of the coupling hole and the metal terminal is shorter than a minimum distance (L2) between the center of the coupling holes and the insertion groove.

A thickness of the absorber is larger than or equal to a depth of the insertion groove.

The absorber is formed of a polyurethane foam material.

The spacer has a spacing portion concentric to the coupling hole and having a diameter larger than that of the coupling holes.

A resilient portion resiliently deformed upwards and downward is formed at a circumference of the coupling hole of the absorber and the spacing portion is formed at a lower portion of the resilient portion such that the resilient portion is spaced apart from the spacer.

A plurality of resilient portions is disposed to be spaced apart from each other about the coupling hole.

A metal terminal contacting the wire spring inserted into the coupling holes is formed in the flexible printed circuit board, and a maximum distance (L3) between the center of the coupling holes and the metal terminal is shorter than a minimum distance (L4) between the center of the coupling holes and the insertion groove.

A coil is mounted to a side surface of the lens holder, a plurality of absorbers are mounted under the lens holder and are disposed to be spaced apart from each other, one end of the wire spring is connected to the flexible printed circuit board and an opposite end of the wire spring is connected to the absorber, and the absorber is formed of an electrode plate and is electrically connected to the lens holder, and has a resilient portion to which an opposite end of the wire spring is coupled, for absorbing an impact applied to the wire spring.

A resilient hole in which the resilient portion is disposed is formed in the absorber, and the resilient portion includes: a coupling piece disposed in the resilient hole and having a fixing hole into which the wire spring is fixedly inserted at a central portion thereof; and at least one resilient piece protruding from the coupling piece and connected to the absorber.

One end of the wire spring passes through the spacer to be connected to the flexible printed circuit board and an opposite end of the wire spring passes through the lens holder to be connected to the absorber, a concave spacing groove is formed on a surface of the lens holder facing the resilient portion, and wherein the resilient portion absorbs an impact applied to the wire spring while being resiliently deformed toward the spacing groove.

The absorbers are spaced apart from each other by a connecting bar, cutaway portions are formed between the absorbers and the connecting bar, and the absorbers are mounted to the lens holder and the cutaway portions are cut off to separate the absorbers from the connecting bar.

The connecting bar is branched into a plurality of parts and the absorbers are connected to ends of the branched parts, respectively, and the widths of the cutaway portions become gradually narrower as they go toward the absorbers.

Advantageous Effects

The vertical wire absorbing structure of a compact camera module according to the present invention has the following effects.

Because the absorber is disposed between the spacer and the flexible printed circuit board, it can absorb an impact applied to the wire spring which couples the lens holder and the spacer when the camera is shaken, thereby preventing connecting portions of the metal terminal and the wire spring from being damaged and separated from each other Because the insertion groove is formed in the spacer and the absorber is inserted into the insertion groove, the thickness of the camera module can be made thin while an impact applied to the wire spring is absorbed when the camera is shaken An impact applied to the wire spring can be effectively transferred to the absorber while the flexible printed circuit board is resiliently deformed upwards and downward by making the maximum distance between the center of the coupling hole and the metal terminal shorter than the minimum distance between the center of the coupling hole and the insertion groove.

Because the thickness of the absorber is larger than or equal to the depth of the insertion groove, the flexible printed circuit board resiliently deformed upwards and downwards can absorb and damp an impact applied to the wire spring.

Because a plurality of resilient portions are formed in the absorber and contacts the circuit board to be resiliently deformed upwards and downward, an impact applied to the wire spring can be effectively transferred to the absorber.

An impact applied to the wire spring can be effectively transferred to the absorber while the flexible printed circuit board is resiliently deformed upwards and downward by making the maximum distance between the center of the coupling hole and the metal terminal shorter than the minimum distance between the center of the coupling hole and the resilient portion.

Because a spacing groove which is concave upwards is formed at an upper portion of the resilient portion under the lens holder, a space can be formed at an upper portion of the resilient portion such that the resilient portion can be easily resiliently deformed upwards and downwards.

Because a plurality of absorbers is integrally formed with the connecting bar, they can be easily assembled under the lens holder.

Because a cutaway portion is formed between the absorber and the connecting bar such that the absorber is integrally formed with the connecting bar and the width of the cutaway portion becomes gradually narrower as it goes toward the absorber, the cutaway portion can be easily cut off at a portion adjacent to the absorber after the absorber is mounted under the lens holder so that the absorber can be easily separated from the connecting bar.

BEST MODE

Mode for Invention

Hereinafter, exemplary embodiments of the present invention will be described in detail with reference to the accompanying drawings.

First Embodiment

Figure 1:
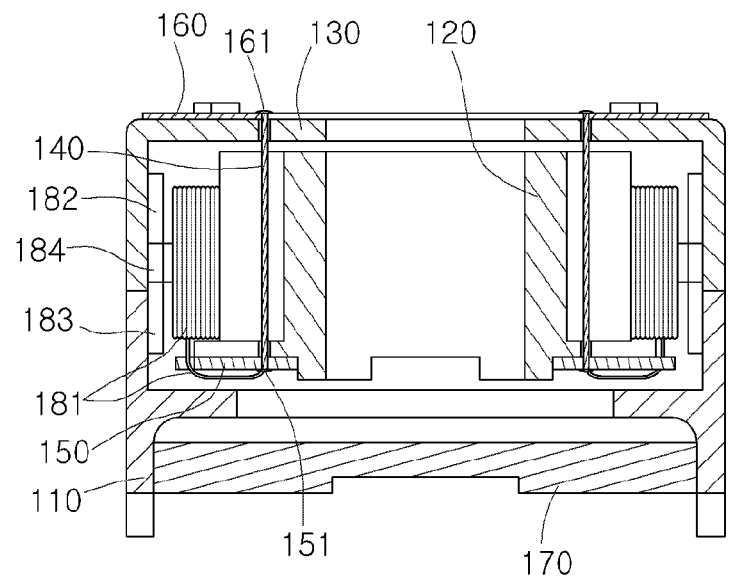
FIG. 1 is a longitudinal sectional view showing an interior structure of a camera module according to the related art.
Figure 2:
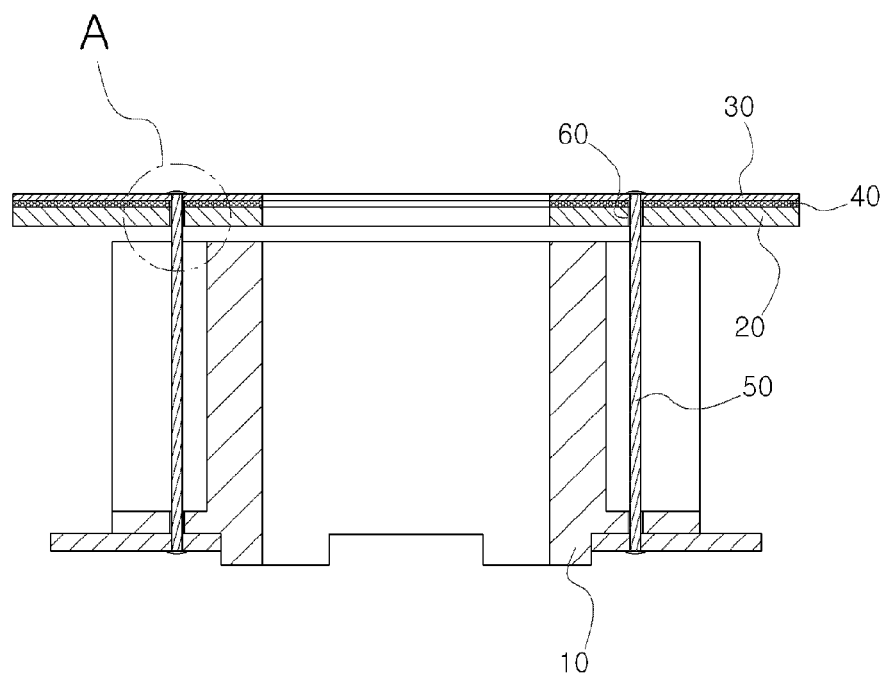
FIG. 2 is a longitudinal sectional view of a vertical wire absorbing structure of a compact camera module according to a first embodiment of the present invention.
Figure 3:
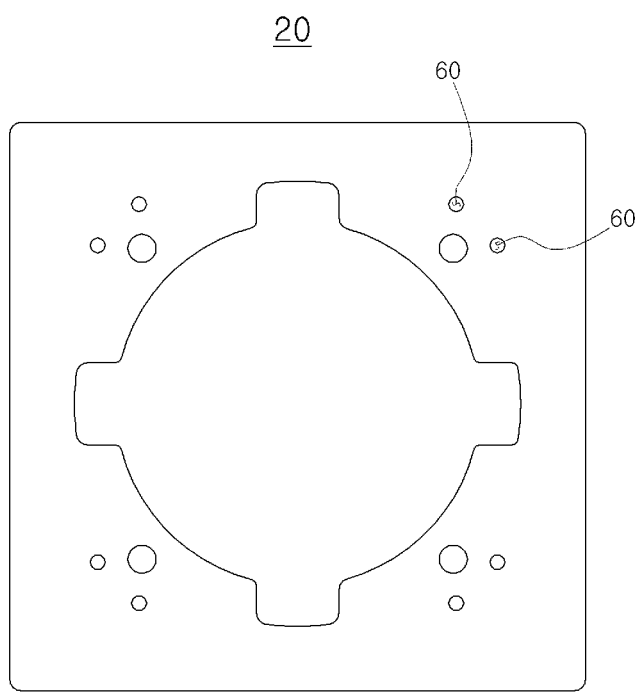
FIG. 3 is a plan view of a spacer according to the first embodiment of the present invention.
Figure 4:
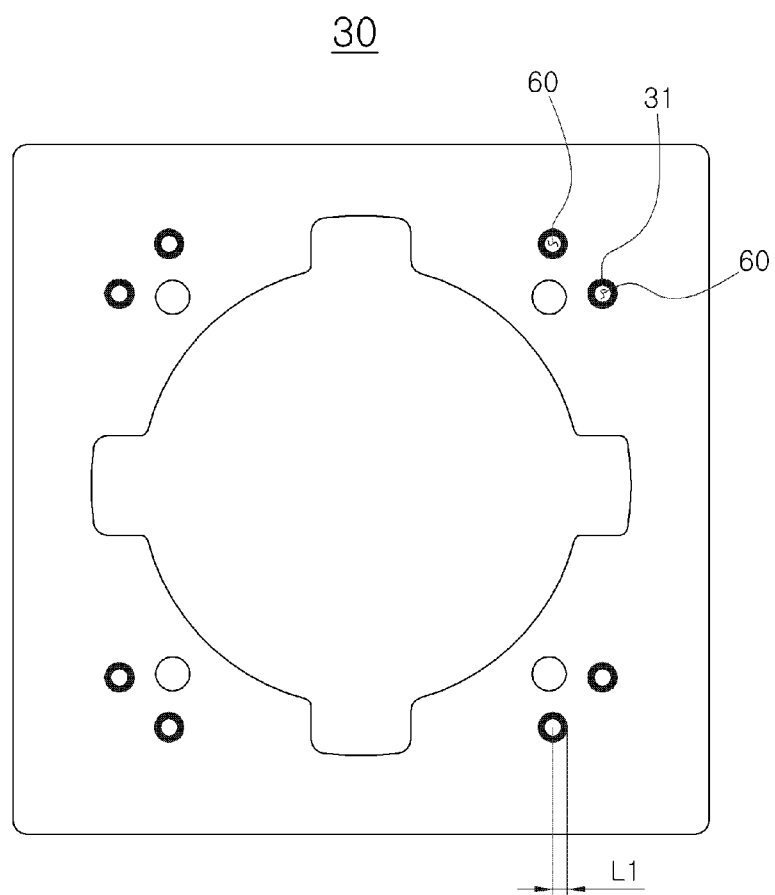
FIG. 4 is a plan view of a circuit board according to the first embodiment of the present invention.
Figure 5:
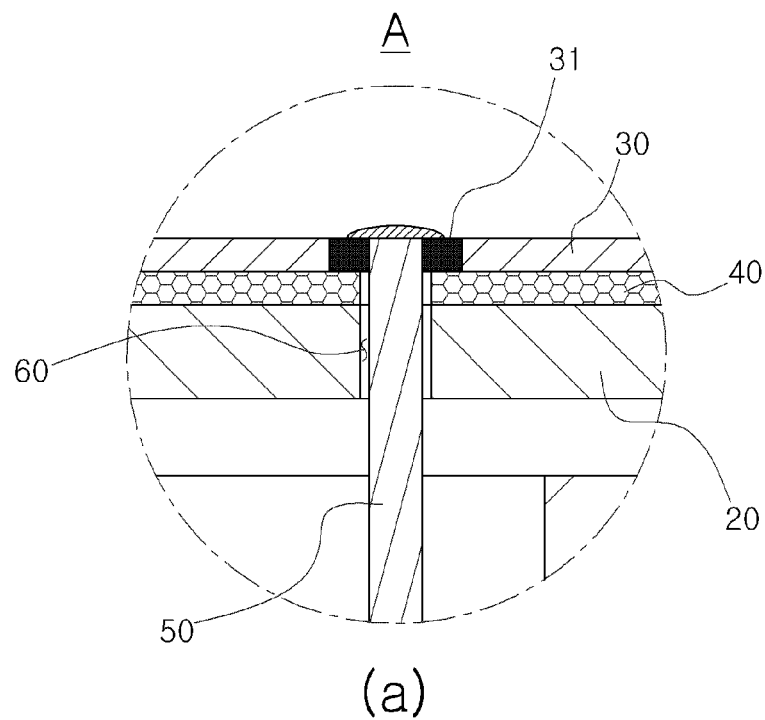
FIG. 5 is an enlarged view of section A of FIG. 2.
Figure 5:
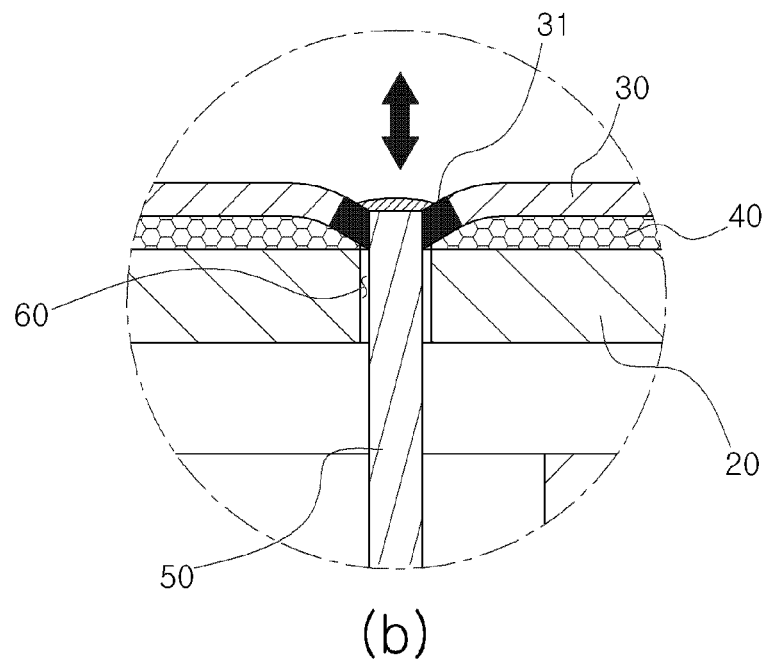

FIG. 2 is a longitudinal sectional view of a vertical wire absorbing structure of a compact camera module according to a first embodiment of the present invention. FIG. 3 is a plan view of a spacer according to the first embodiment of the present invention. FIG. 4 is a plan view of a flexible printed circuit board according to the first embodiment of the present invention. (a) of FIG. 5 is an enlarged view of section A of FIG. 2. (b) of FIG. 5 is a view showing a state in which a wire spring is lowered as a camera is shaken in (a) of FIG. 5.

As shown in FIGS. 2 to 5, the vertical wire absorbing structure of a compact camera module according to the first embodiment of the present invention includes a lens holder 10, a spacer 20, a flexible printed circuit board 30, an absorber 40, and a wire spring 50.

A camera lens (not shown) is mounted to the lens holder 10, and the lens holder 10 is disposed under the spacer 20.

As shown in FIG. 2, the lens holder 10 is coupled to the spacer 20 to be horizontally moved by the wire spring 50.

Accordingly, when the camera is shaken, the lens holder 10 is horizontally moved by a driving unit (not shown) mounted to the camera module to correct shaking of a subject image captured by a lens.

The spacer 20 is fixedly disposed on the lens holder 10.

The flexible printed circuit board 30 is disposed on the spacer 20, and the absorber 40 is disposed between the spacer 20 and the flexible printed circuit board 30.

As shown in FIGS. 2 to 4, the spacer 20, the absorber 40, and the flexible printed circuit board 30 have coupling holes 60 through which one end, that is, an upper end of the wire spring 50 passes and is inserted into the coupling holes 60.

The flexible printed circuit board 30 is disposed on the spacer 20, and the absorber 40 is disposed under the flexible printed circuit board 30.

The shape of the flexible printed circuit board 30 may be deformed by an external force.

As shown in FIG. 4, the flexible printed circuit board 30 has metal terminals 31 at circumferences of the coupling holes 60.

The metal terminal 31 contacts an upper end of the wire spring 50 inserted into the coupling hole 60 such that a current flows to a coil (not shown) mounted to the lens holder 10 through the wire spring 50.

In this way, a current is supplied to the coil and the lens holder 10 is horizontally moved by a driving unit including the coil.

The absorber 40 is disposed between the spacer 20 and the flexible printed circuit board 30.

The absorber 40 is formed of a polyurethane foam material to absorb an impact of the wire spring 50 which moves upwards and downwards.

As an example, the absorber 40 may be formed of a PORON material, and may be formed of various resilient materials which can absorb an external impact.

As shown in FIG. 2, an upper end of the wire spring 50 passes through the spacer 20 and the absorber 40 and is connected to the flexible printed circuit board 30 and a lower end of the wire spring 50 is fixedly mounted to the lens holder 10 so that the spacer 20 is coupled such that the lens holder 10 is horizontally moved.

That is, an upper end of the wire spring 50 is inserted into the coupling hole 60 and is fixed to the metal terminal 31 while contacting the metal terminal 31, and a lower end of the wire spring 50 is fixed to the lens holder 10.

In general, the wire spring 50 is fixed to the metal terminal 31 through soldering, and when the camera is shocked or shaken, the lens holder 10 is horizontally moved for correction of an image captured by the lens and is shaken upwards and downwards as well.

Then, if the camera module fails to offset an upward/downward impact and shaking in the interior thereof, an impact is concentrated on an upper end of the wire spring 50 connected to the metal terminal 31 such that the wire spring 50 is disconnected from the metal terminal 31.

Accordingly, as shown in (b) of FIG. 5, an impact concentrated on an upper end of the wire spring 50 is dispersed while the flexible printed circuit board 30 connected to the wire spring 50 is deformed upwards and downwards, and the absorber 40 is disposed under the flexible printed circuit board 30 to absorb the impact concentrated to the upper end of the wire spring 50 through the flexible circuit board 30.

In this way, as the absorber 40 is disposed between the spacer 20 and the flexible printed circuit board 30, it can absorb an impact applied to the wire spring 50 which couples the lens holder 10 and the spacer 20 when the camera is shaken, thereby preventing connecting portions of the metal terminal 31 and the wire spring 50 from being damaged and separated from each other.

In addition, a separate reinforcing unit for reinforcing a coupling force of the metal terminal 31 and the wire spring 50 against such an impact is not necessary.

In detail, if the camera is shaken to generate a vertical impact to the wire spring 50, the absorber 40 is compressed while an outer portion of the metal terminal 31 of the flexible printed circuit board 30 is bent downwards as shown in (b) of FIG. 5, and the absorber 40 is compressed and restored again as shown in (b) of FIG. 5 to absorb a vertical impact.

The vertical impact is offset while the absorber 40 is repeatedly compressed and expanded.

Second Embodiment

Figure 6:
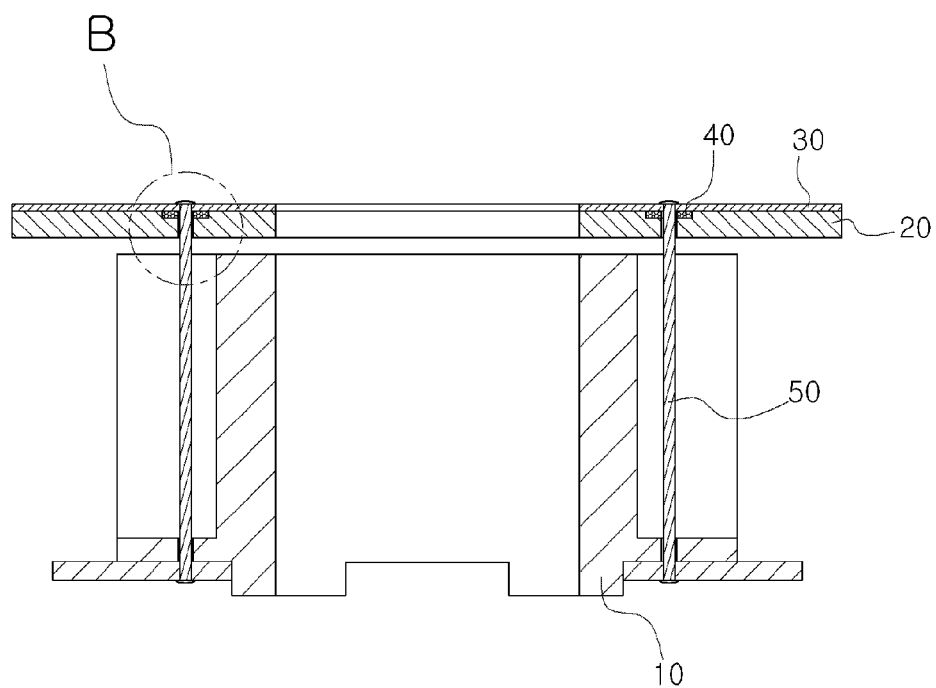
FIG. 6 is a longitudinal sectional view of a vertical wire absorbing structure of a compact camera module according to a second embodiment of the present invention.
Figure 7:
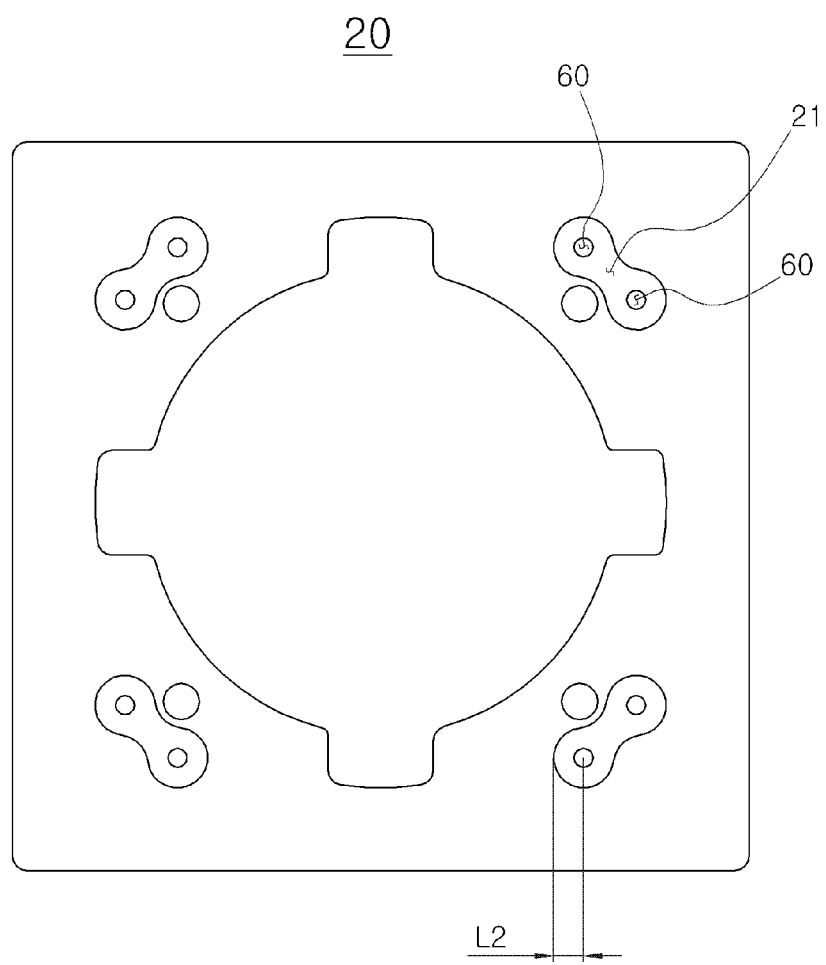
FIG. 7 is a plan view of a spacer according to the second embodiment of the present invention.

FIG. 6 is a longitudinal sectional view of a vertical wire absorbing structure of a compact camera module according to a second embodiment of the present invention. FIG. 7 is a plan view of a spacer according to the second embodiment of the present invention. (a) of FIG. 5 is an enlarged view of section B of FIG. 6. (b) of FIG. 8 is a view showing a state in which a wire spring is lowered as a camera is shaken in (a) of FIG. 8.

Figure 8:
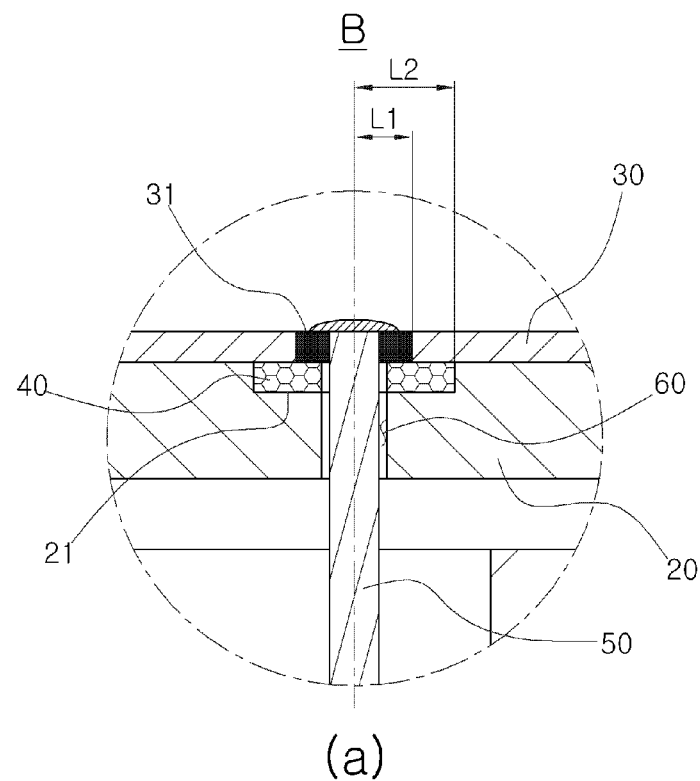
FIG. 8 is an enlarged view of section B of FIG. 6.
Figure 8:
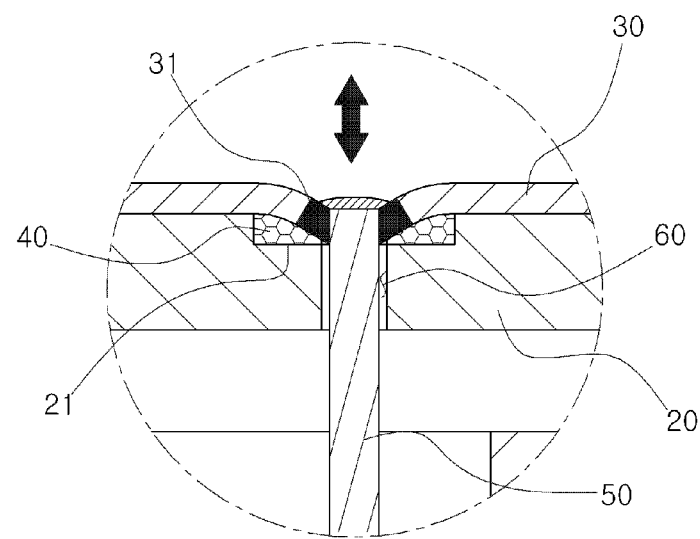

As shown in FIGS. 6 to 8, the vertical wire absorbing structure of a compact camera module according to the second embodiment of the present invention includes a lens holder 10, a spacer 20, a flexible printed circuit board 30, an absorber 40, and a wire spring 50.

The lens holder 10 is the same as that of the first embodiment, and a detailed description thereof will be omitted.

The spacer 20 is fixedly disposed on the lens holder 10.

The flexible printed circuit board 30 is disposed on the spacer 20, and the absorber 40 is interposed between the spacer 20 and the flexible printed circuit board 30.

The spacer 20, the absorber 40, and the flexible printed circuit board 30 have coupling holes 60 through which one end, that is, an upper end of the wire spring 50 passes and is inserted into the coupling holes 60.

As shown in FIG. 7, an insertion groove 21 communicated with the coupling hole 60 is formed at an upper portion of the spacer 20.

As the absorber 40 is inserted into the insertion groove 21, an impact applied to the wire spring 50 can be absorbed and damped by using the absorber without increasing a thickness between the spacer 20 and the flexible printed circuit board 30.

The flexible printed circuit board 30 is mounted to an upper portion of the spacer 20, and is the same as that of the first embodiment.

The flexible printed circuit board 30 has metal terminals 31 at circumferences of the coupling holes 60.

An upper end of the wire spring 50 inserted into the coupling hole 60 contacts the metal terminal 31, and a maximum distance L1 between the center of the coupling hole 60 and the metal terminal 31 is shorter than a minimum distance L2 between the center of the coupling hole 60 and the insertion groove 21 as shown in (a) of FIG. 8.

Accordingly, the flexible printed circuit board 30 at an outside of the metal terminal 31 is folded at an upper portion of the absorber 40 to effectively transfer an impact applied to the wire spring 50 to the absorber 40 while being resiliently deformed upwards and downwards.

Meanwhile, if the maximum distance L1 between the center of the coupling hole 60 and the metal terminal 31 is longer than or equal to the minimum distance L2 between the center of the coupling hole 60 and the insertion groove 21, the metal terminal 31 completely covers the absorber 40 inserted into the insertion groove 21, and the flexible printed circuit board 30 at an outside of the metal terminal 31 contacts an upper surface of the spacer 20 and cannot be deformed upwards and downwards.

Accordingly, an impact concentrated on an upper end of the wire spring 50 should be transferred to the absorber 40 while the metal terminal 31 is resiliently deformed upwards and downwards, but because a resiliency of the metal terminal is too low to effectively transfer an impact to the absorber 40, an impact applied to the wire spring 50 can be effectively transferred to the absorber 40 while the flexible printed circuit board 30 is resiliently deformed upwards and downward by making the maximum distance L1 between the center of the coupling hole 60 and the metal terminal 31 shorter than the minimum distance L2 between the center of the coupling hole 60 and the insertion groove 21.

The absorber 40 is inserted into the insertion groove 21 and disposed between the spacer 20 and the flexible printed circuit board 30.

The thickness of the absorber 40 is larger than or equal to the depth of the insertion groove 21.

As the thickness of the absorber 40 is larger than or equal to the depth of the insertion groove 21, the flexible printed circuit board 30 resiliently deformed upwards and downwards as shown in (b) of FIG. 8 can absorb and damp an impact applied to the wire spring 50.

If the camera is shaken and an vertical impact occurs in the wire spring 50 as in the first embodiment, the absorber 40 offsets a vertical impact while the absorber 40 is repeatedly compressed and expanded as shown in FIG. 8.

In this way, as the insertion groove 21 is formed in the spacer 20 and the absorber 40 is inserted into the insertion groove 21, the thickness of the camera module can be made thin while an impact applied to the wire spring 50 is absorbed when the camera is shaken.

The other items of the second embodiment are the same as those of the first embodiment, and a detailed description thereof will be omitted.

Third Embodiment

Figure 9:
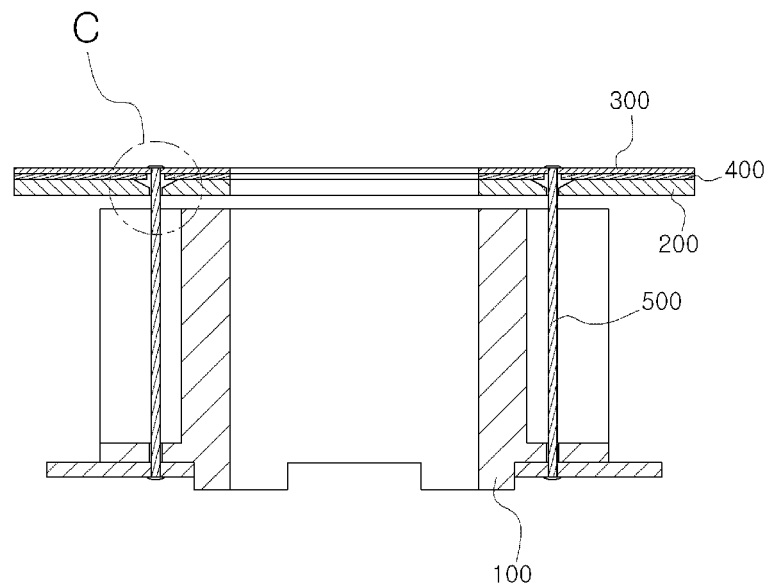
FIG. 9 is a longitudinal sectional view of a vertical wire absorbing structure of a compact camera module according to a third embodiment of the present invention.
Figure 10:
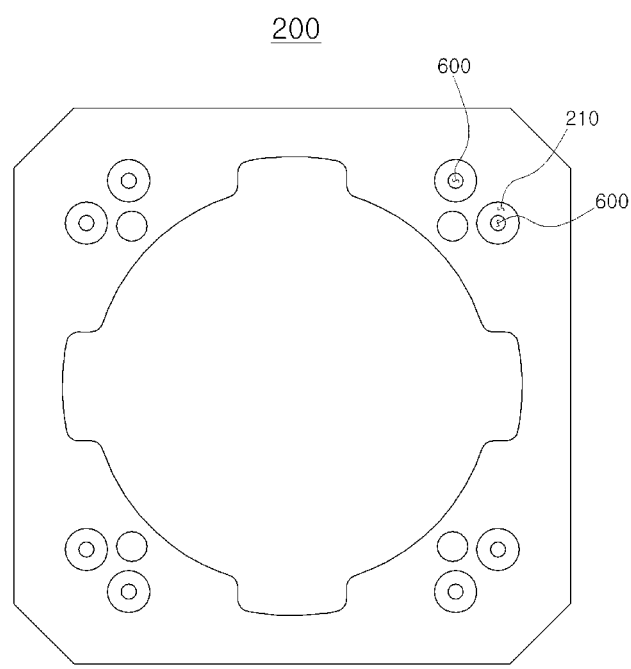
FIG. 10 is a plan view of a spacer according to the third embodiment of the present invention.
Figure 11:
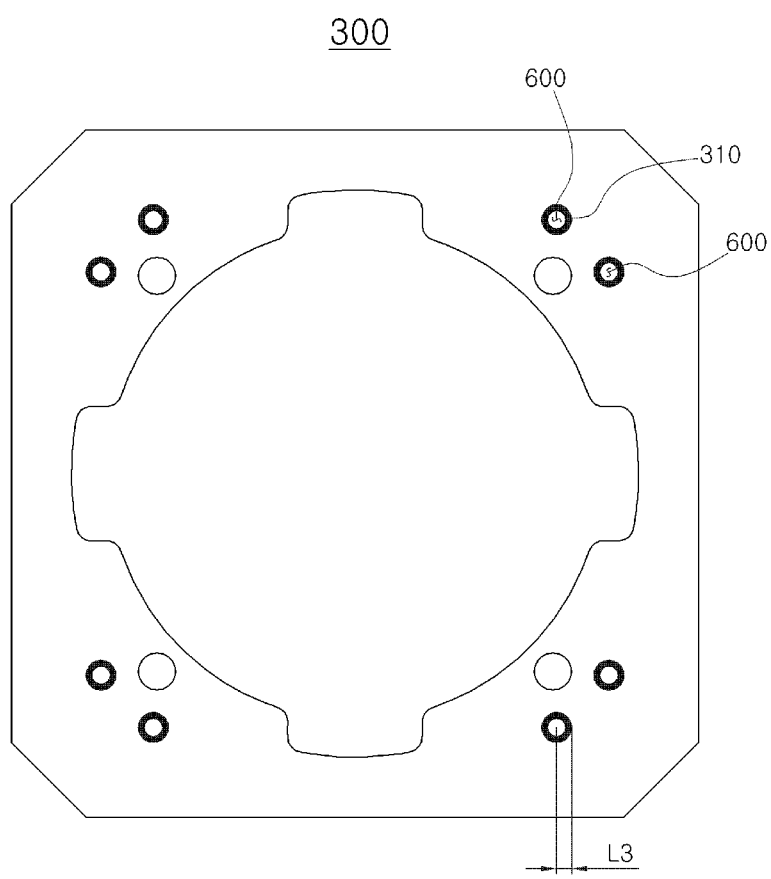
FIG. 11 is a plan view of a circuit board according to the third embodiment of the present invention.
Figure 12:
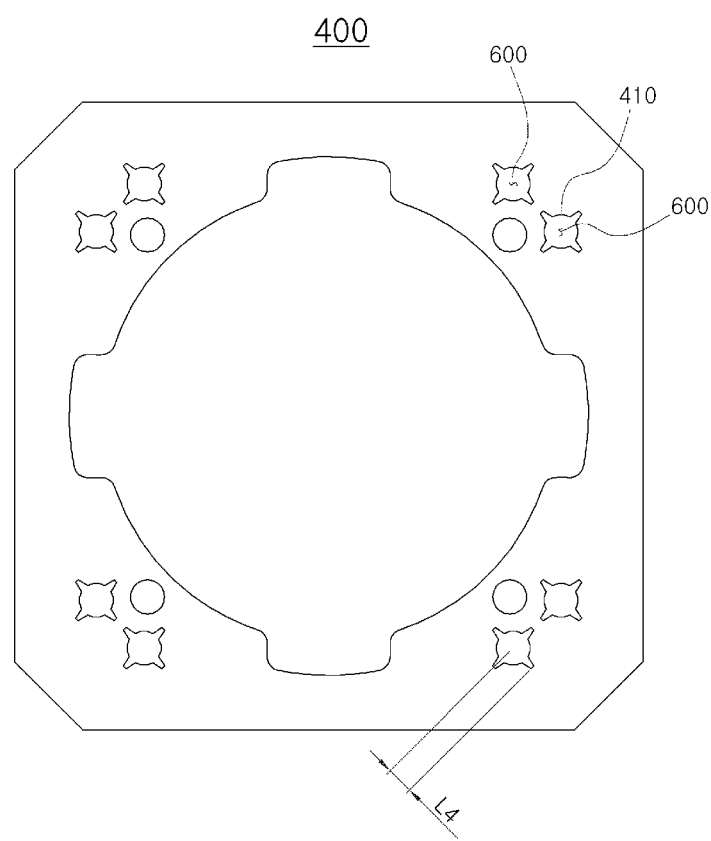
FIG. 12 is a plan view of an absorber according to the third embodiment of the present invention.
Figure 13:
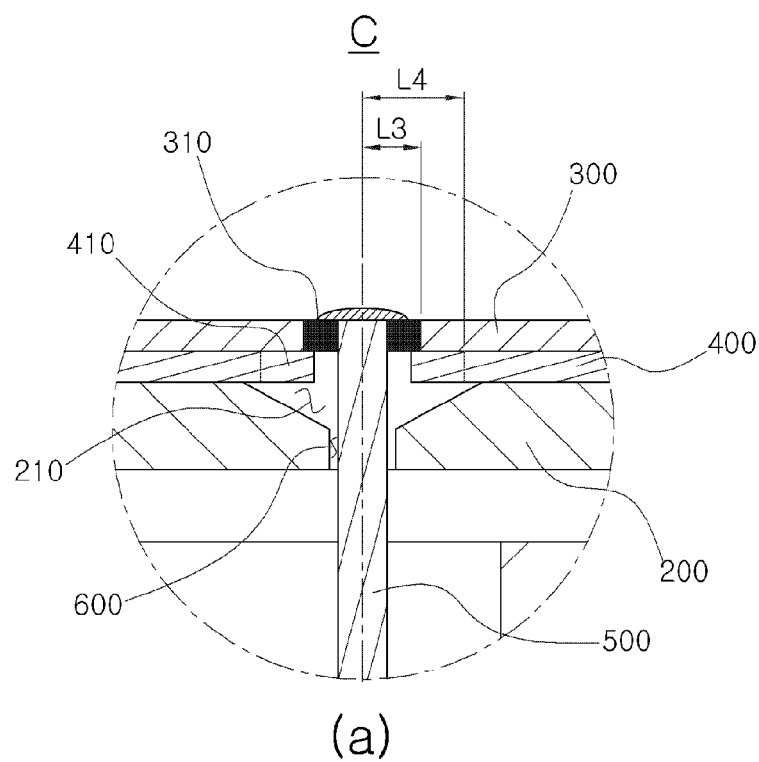
FIG. 13 is an enlarged view of section C of FIG. 9.
Figure 13:
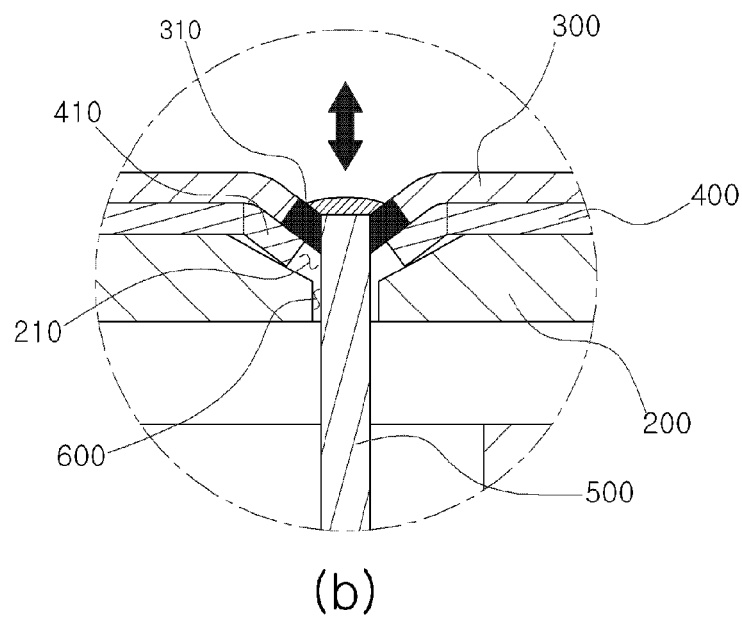

FIG. 9 is a longitudinal sectional view of a vertical wire absorbing structure of a compact camera module according to a third embodiment of the present invention. FIG. 10 is a plan view of a spacer according to the third embodiment of the present invention. FIG. 11 is a plan view of a flexible printed circuit board according to the third embodiment of the present invention. FIG. 12 is a plan view of an absorber according to the third embodiment of the present invention. (a) of FIG. 13 is an enlarged view of section C of FIG. 9. (b) of FIG. 13 is a view showing a state in which a wire spring is lowered as a camera is shaken in (a) of FIG. 13.

As shown in FIGS. 9 to 13, the vertical wire absorbing structure of a compact camera module according to the embodiment of the present invention includes a lens holder 100, a spacer 200, a flexible printed circuit board 300, an absorber 400, and a wire spring 500.

A camera lens (not shown) is mounted to the lens holder 100, and the lens holder 10 is disposed under the spacer 200.

As shown in FIG. 9, the lens holder 100 is coupled to the spacer 200 to be horizontally moved by the wire spring 500.

Accordingly, when the camera is shaken, the lens holder 100 is horizontally moved by a driving unit (not shown) mounted to the camera module to correct shaking of a subject image captured by a lens.

The spacer 200 is fixedly disposed on the lens holder 100.

The flexible printed circuit board 300 is disposed on the spacer 200, and the absorber 400 is interposed between the spacer 200 and the flexible printed circuit board 300.

As shown in FIGS. 9 to 12, the spacer 200, the absorber 400, and the flexible printed circuit board 300 have coupling holes 600 through which one end, that is, an upper end of the wire spring 500 passes and is inserted into the coupling holes 60.

As shown in (a) of FIG. 13, the spacer 200 has a spacing portion 210 concentric to the coupling hole 600 and having a diameter larger than the diameter of the coupling hole 600.

The diameter of the spacing portion 210 becomes smaller as it goes downwards.

In this way, as the spacing portion 210 is formed in the spacer 200, a space in which a resilient portion 410 formed in the absorber 400 may be resiliently deformed downwards is formed.

The above-mentioned spacing portion 210 may have various shapes such that the resilient portion 410 formed in the absorber 400 is resiliently deformed downwards.

The flexible printed circuit board 300 is disposed on the spacer 200, and the absorber 400 is disposed under the flexible printed circuit board 30.

As shown in FIG. 11, the flexible printed circuit board 11 has metal terminals 310 at circumferences of the coupling holes 600.

The metal terminal 310 contacts an upper end of the wire spring 500 inserted into the coupling hole 600 such that a current flows to a coil (not shown) mounted to the lens holder 100 through the wire spring 500.

In this way, a current is supplied to the coil and the lens holder 100 is horizontally moved by a driving unit (not shown) including the coil.

The absorber 400 is formed of a resilient plastic material and is disposed between the spacer 200 and the flexible printed circuit board 300.

As shown in FIG. 12, a resilient portion resiliently deformed upwards and downwards is formed at a circumference of the coupling hole 600 in the absorber 400.

A plurality of resilient portions 410 are formed to be spaced apart from each other about the coupling hole 600.

The resilient portion may be integrally formed, but as a plurality of resilient portions 410 are spaced apart from each other as in the embodiment of the present invention, they may be easily deformed upwards and downwards.

The resilient portions 410 contact the flexible printed circuit board 300, and a lower surface of the resilient portion 410 is spaced apart from the spacer 200 by the spacing portion 210.

Accordingly, the resilient portion 410 is resiliently deformed downwards together with the flexible printed circuit board 300.

In addition, the maximum distance L3 between the center of the coupling hole 600 and the metal terminal 310 is shorter than the maximum distance L4 between the center of the coupling hole 600 and the resilient portion 410.

Accordingly, the flexible printed circuit board 300 at an outside of the metal terminal 310 is folded at an upper portion of the resilient portion 410 to effectively transfer an impact applied to the wire spring 500 to the absorber 400 while being resiliently deformed upwards and downwards.

Meanwhile, if the maximum distance L3 between the center of the coupling hole 600 and the metal terminal 310 is longer than or equal to the minimum distance L4 between the center of the coupling hole 600 and the resilient portion 410, the metal terminal 310 completely covers the resiliently portion 410, and the flexible printed circuit board 300 at an outside of the metal terminal 310 contacts an upper surface of the absorber 400 and cannot be deformed upwards and downwards.

Accordingly, an impact concentrated on an upper end of the wire spring 500 should be damped while the metal terminal 310 is resiliently deformed upwards and downwards together with the resilient portion 410, but because a resiliency of the metal terminal 310 is too low to effectively offset an impact together with the absorber 40, an impact applied to the wire spring 500 can be offset while the flexible printed circuit board 300 is resiliently deformed upwards and downward together with the resilient portion 410 by making the maximum distance L3 between the center of the coupling hole 600 and the metal terminal 310 shorter than the minimum distance L4 between the center of the coupling hole 600 and the resilient portion 410.

An upper end of the wire spring 500 passes through the spacer 200 and the absorber 400 and is connected to the flexible printed circuit board 300 and a lower end of the wire spring 50 is fixedly mounted to the lens holder 100 so that the spacer 200 is coupled such that the lens holder 100 is horizontally moved.

That is, an upper end of the wire spring 500 is inserted into the coupling hole 600 and is fixed to the metal terminal 310 while contacting the metal terminal 31, and a lower end of the wire spring 50 is fixed to the lens holder 100.

Accordingly, the lens holder 100 is coupled to the spacer 200 to be horizontally moved by the wire spring 500.

In general, the wire spring 500 is fixed to the metal terminal 310 through soldering, and when the camera is shocked or shaken, the lens holder 100 is horizontally moved for correction of a subject image captured by the lens and is shaken upwards and downwards as well.

Then, if the camera module fails to offset an upward/downward impact and shaking in the interior thereof, an impact is concentrated on an upper end of the wire spring 500 connected to the metal terminal 310 such that the wire spring 50 is disconnected from the metal terminal 310.

Accordingly, as shown in (b) of FIG. 13, the flexible printed circuit board 300 connected to the wire spring 500 absorbs and offsets an impact concentrated on an upper end of the wire spring 500 while being resiliently deformed upwards and downwards together with the resilient portion 410.

In this way, as the absorber 400 is disposed between the spacer 200 and the flexible printed circuit board 300, it can absorb an impact applied to the wire spring 500 which couples the lens holder 100 and the spacer 200 when the camera is shaken, thereby preventing connecting portions of the flexible printed circuit board 300 and the wire spring 500 from being damaged and separated from each other.

In detail, if the camera is shaken to generate a vertical impact to the wire spring 500, the absorber 410 is compressed while an outer portion of the metal terminal 310 of the flexible printed circuit board 300 is bent downwards as shown in (b) of FIG. 13, and the absorber 13 is restored again by a resiliently restoring force of the resilient portion 410 as shown in (a) of FIG. 13 to absorb a vertical impact.

In this way, a vertical impact is offset while the flexible printed circuit board 300 is repeatedly bent and restored together with the resilient portion 410.

In addition, a separate reinforcing unit for reinforcing a coupling force of the metal terminal 310 and the wire spring 500 against such an impact is not necessary.

Fourth Embodiment

Figure 14:
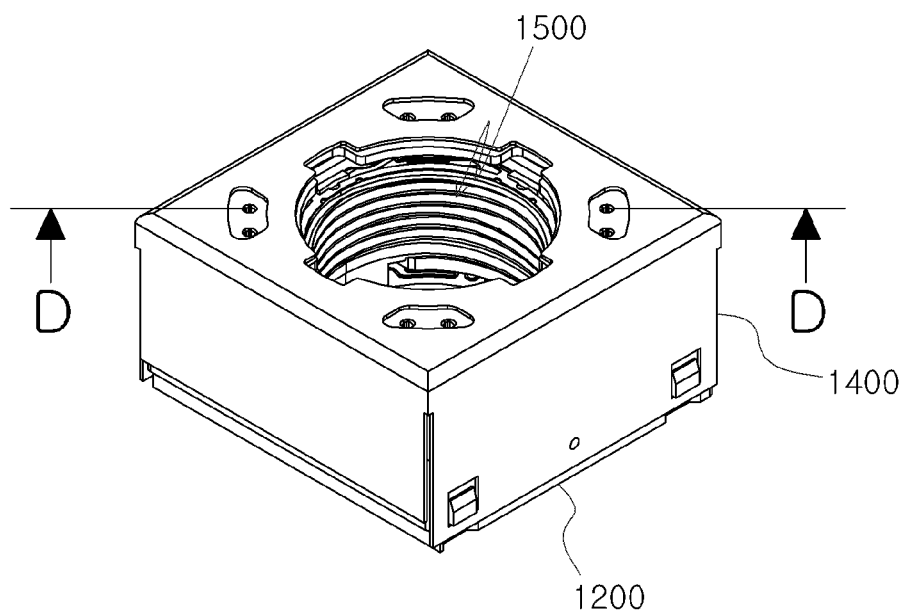
FIG. 14 is a perspective view of a compact camera module according to a fourth embodiment of the present invention.
Figure 15:
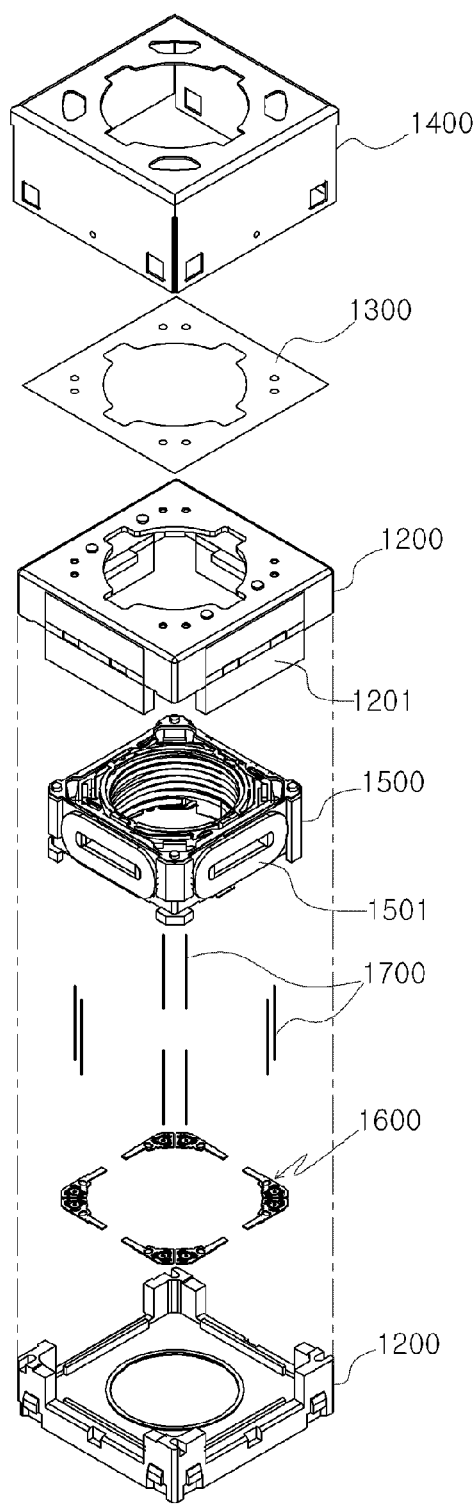
FIG. 15 is an exploded perspective view of the compact camera module according to the fourth embodiment of the present invention.
Figure 16:
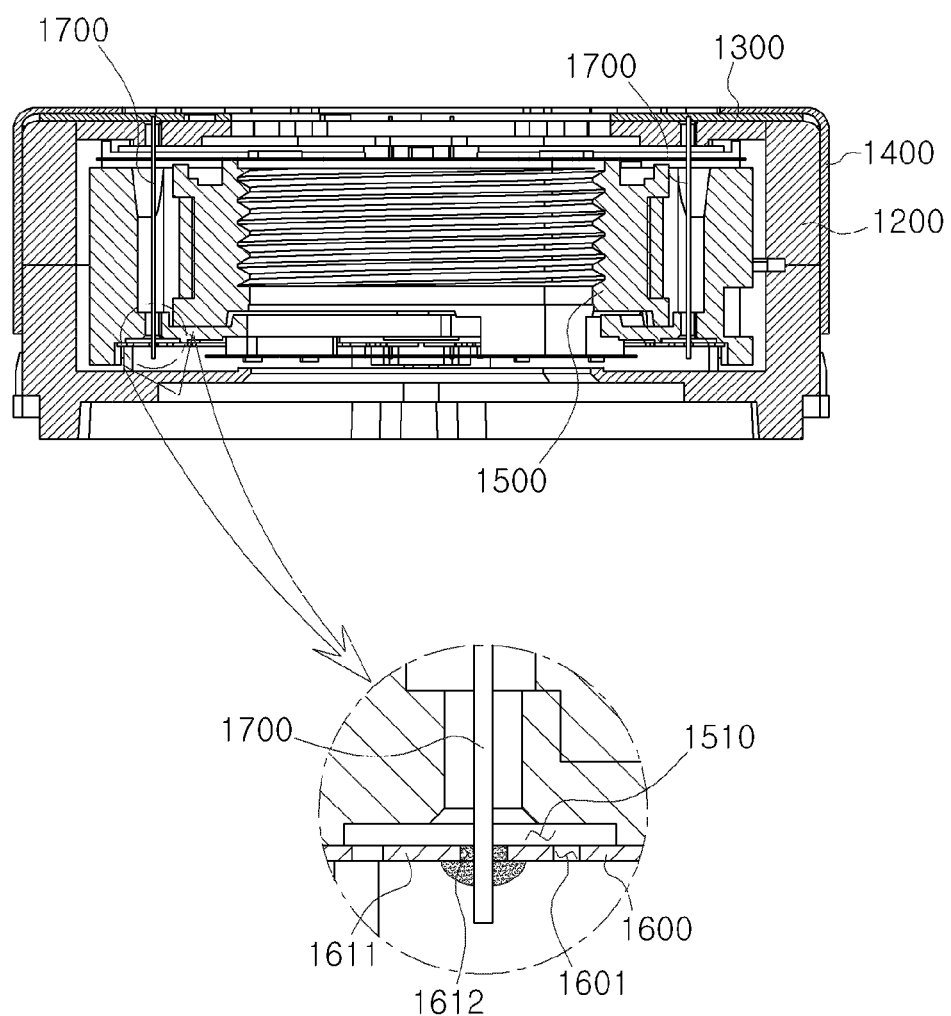
FIG. 16 is a longitudinal sectional view of a vertical wire absorbing structure of the compact camera module taken along line D-D of FIG. 14.
Figure 17:
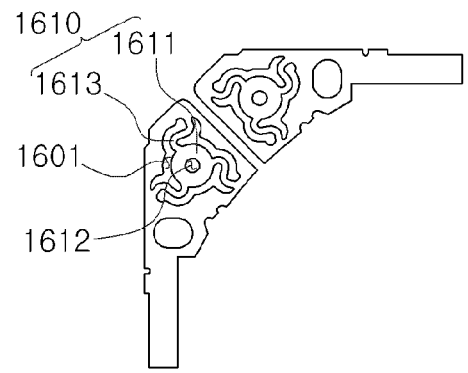
FIG. 17 is a view showing various shapes of a resilient member according to the fourth embodiment of the present invention.
Figure 17:
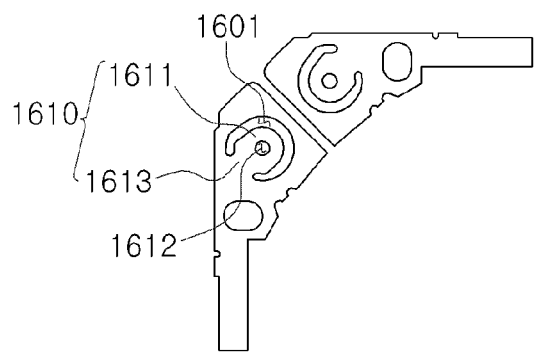
Figure 17:
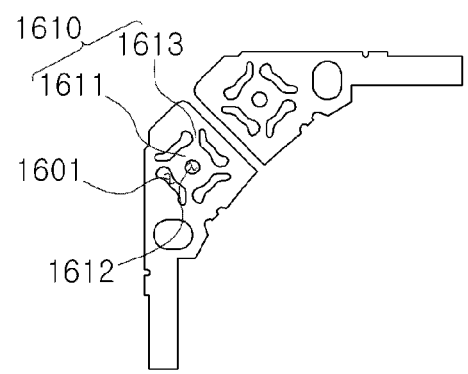
Figure 18:
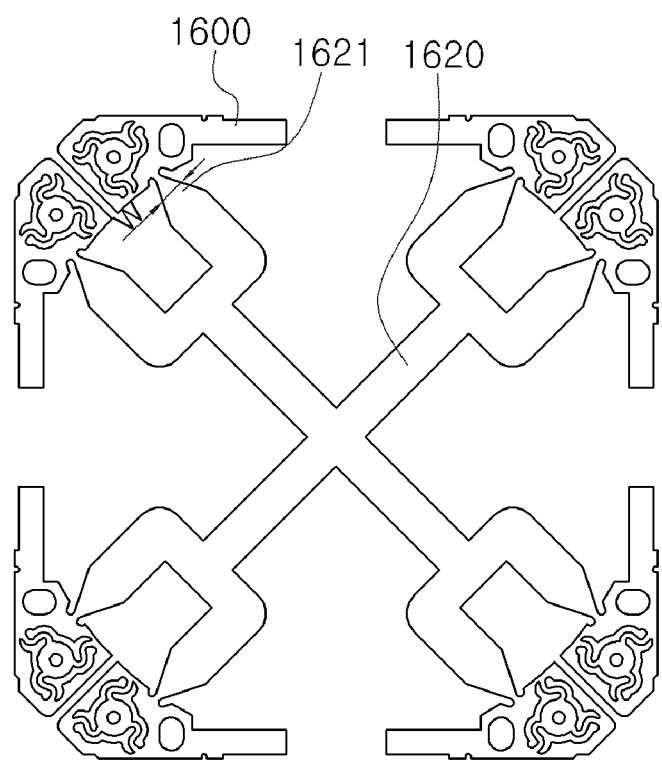
FIG. 18 is a view showing various shapes of an absorber integrally formed with a connecting bar according to the fourth embodiment of the present invention.

FIG. 14 is a perspective view of a compact camera module according to a fourth embodiment of the present invention. FIG. 15 is an exploded perspective view of the compact camera module according to the fourth embodiment of the present invention. FIG. 16 is a sectional view taken along line D-D of FIG. 14; FIG. 17 is a view showing various shapes of a resilient member according to the fourth embodiment of the present invention. FIG. 18 is a view showing various shapes of an absorber integrally formed with a connecting bar according to the fourth embodiment of the present invention.

As shown in FIGS. 14 to 18, the wire spring absorbing structure of a compact camera module according to the fourth embodiment of the present invention includes a spacer 1200, a flexible printed circuit board 1300, a cover 1400, a lens holder 1500, an absorber 1600, and a wire spring 1700.

The spacer 1200 is mounted to a terminal to which a camera module is mounted, and is disposed at an upper portion of the lens holder 1500 to space the lens holder 1500 apart from the terminal.

As shown in FIGS. 14 and 15, the spacer 1200 has a hexahedral shape, and magnets are mounted to four side surface of the spacer 1200 to form a magnetic field around coils 1501 mounted to the lens holder 1500.

The spacer 1200 is separated into upper and lower parts, and the magnet 1201 is mounted between the upper and lower parts of the spacer 1200.

The flexible printed circuit board 1300 is disposed at an upper portion of the spacer 1200.

The flexible printed circuit board 1300 is disposed at an upper portion of the spacer 1200 by a thermosetting bond.

The cover 1400 is coupled to an upper portion of the spacer 1200 to cover the flexible printed circuit board 1300.

A camera lens (not shown) is mounted to the lens holder 1500, and the coil 1501 is mounted to a side surface of the lens holder 1500.

As described above, the lens holder is disposed under the spacer 1200 to be spaced apart from the terminal to which the camera module is mounted.

In detail, as shown in FIG. 16, the lens holder 1500 is coupled to a lower portion of the spacer 1200 by the wire spring and is spaced apart from the terminal.

A spacing recess 1510 is formed at a lower portion of the lens holder 1500.

The spacing groove 1510 is formed to be concave upwards and a resilient portion 1610 formed in the absorber 1600 is disposed at a lower portion of the spacing groove 1510.

The absorber 1600 is mounted to a lower portion of the lens holder 1500, and is formed of an electrode plate of a metallic material to be electrically connected to the coil 1501.

A plurality of absorbers 1600 are spaced apart from each other such that each of the absorbers 1600 has a resilient portion 1610 and a lower end of the wire spring 1700 is coupled to the resilient portion 1610 which absorbs an impact applied to the wire spring 1700.

Because the wire spring 1700 couples the lens holder 1500 to a lower portion of the spacer 1200 such that the lens holder 1500 is horizontally moved while being spaced apart from the terminal to which the camera module is mounted, an impact is concentrated on the wire spring 1700 while the lens holder 1500 is shaken if an external impact such as shaking occurs in the camera module.

In detail, as shown in (a) of FIG. 17, the absorber 1600 has a resilient hole 1601 in which a resilient portion 1610 is disposed.

The resilient portion 1610 is disposed at a lower portion of the spacing groove 1510, and includes a coupling piece 1611 and a resilient piece 1613.

The coupling piece 1611 is disposed in the resilient hole 1601, and a fixing hole 1612 into which the wire spring 1700 is fixedly inserted is formed at a central portion of the coupling piece 1611.

The resilient piece 1613 protrudes from the coupling piece 1611 and is connected to the absorber 1600.

The resilient piece 1613 is resiliently deformed when a vertical impact occurs in the camera module.

Accordingly, the resilient portion 1610 absorbs a vertical impact applied to the wire spring 1700 while being resiliently deformed upwards and downwards in the spacing groove 1510.

As shown in (b) and (c) of FIG. 17, the resilient portion may have various shapes, and can absorb a vertical impact applied to the wire spring 1700 while being resiliently deformed upwards and downwards.

Meanwhile, as shown in FIG. 18, the absorbers 1600 are disposed to be spaced apart from each other by a connecting bar 1620 to be integrally formed with the connecting bar 1620 before being mounted to the lens holder 1500.

A cutaway portion 1621 is formed between the absorber 1600 and the connecting bar 1620.

In detail, the connecting bar 1620 is branched into a plurality of parts, and the absorbers 1600 are connected to ends of the branched parts, respectively and the width of the cutaway portion 1621 becomes narrower as it goes toward the absorber 1600.

Accordingly, a portion of the connecting bar 1620 connected to the absorber 1600 can be easily cut off by the cutaway portion 1621, and the absorber 1600 and the connecting bar 1620 can be easily separated from each other after the absorber 1600 is mounted under the lens holder 1500.

In this way, as a plurality of absorbers 1600 is integrally formed with the connecting bar 1620, they can be easily assembled under the lens holder 1500 in correspondence to their locations.

That is, because the plurality of absorbers 1600 are integrally formed with the connecting bar 1620, they can be easily disposed under the lens holder 1500 at a time.

In this way, after the absorbers 1600 are disposed under the lens holder 1500 and are mounted under the lens holder 1500, the cutaway portions 1621 connected to the absorbers 1600 are cut off to separate the absorbers 1600 from the connecting bar 1620.

As described above, because the width of the cutaway portion 1621 becomes gradually narrower as it goes toward the absorber 1600, the cutaway portion 1621 can be easily cut and separated at a portion thereof adjacent to the absorber 1600.

As shown in FIG. 16, an upper end of the wire spring 1700 passes through an upper portion of the spacer 1200 to be connected to the flexible printed circuit board 1300, and a lower end of the wire spring 1700 passes through a lower portion of the lens holder 1500 to be connected to the absorber 1600.

The wire spring 1700 couples the lens holder 1500 such that the lens holder 1500 may be horizontally moved with respect to the spacer 1200.

In detail, opposite ends of the wire springs 1700 are coupled to the flexible printed circuit board 1300 and the absorber 1600 through soldering to electrically connect the flexible printed circuit board 1300 and the absorber 1600.

Accordingly, if the camera module is shaken, the location of the lens holder 1500 may be corrected such that shaking of the lens mounted to the lens holder 1500 can be minimized by applying a current from the flexible printed circuit board 1300 to the coil 1501 through the wire spring 1700 and the absorber 1600.

In addition, as the resilient portion 1610 is resiliently deformed in the spacing groove 1510 upwards and downwards when an upward/downward impact occurs in the camera module, an upward/downward impact applied to the wire spring 1700 is absorbed and dispersed.

Because opposite ends of the wire spring 1700 are fixed to the flexible printed circuit board 1300 and the absorber 1600 through soldering such that the lens holder 1500 is coupled to the spacer 1200, an upward/downward impact occurring in the camera module is concentrated on opposite ends of the wire spring 1700, and if such an impact is repeated for a long time, connecting portions of the wire spring 1700 connected to the flexible printed circuit board 1300 and the absorber 1600 may be damaged and separated.

Accordingly, as described above, because a lower end of the wire spring 1700 is fixedly coupled to the resilient portion 1610 such that the resilient portion 1610 is resiliently deformed upwards and downwards to absorb an impact applied to the wire spring 1700 when an impact occurs in the camera module, an impact concentrated on opposite ends of the wire spring 1700 can be dispersed so that durability of the camera module can be further improved.

According to occasions, an upper end of the wire spring 1700 may not be directly fixedly connected to the flexible printed circuit board 1300, but an absorber may be formed between an upper end of the wire spring 1700 and the flexible printed circuit board 1300 and the upper end of the wire spring 1700 may be fixedly coupled to the resilient portion formed in the absorber to absorb an upward/downward impact.

In addition to the above-described wire spring absorbing structure of a compact camera module, a spacer and the lens holder may be horizontally disposed to lateral sides thereof, and one end of the wire spring may be connected to the circuit board mounted to the spacer and an opposite end of the wire spring may be connected to an absorber mounted to the lens holder such that a focus of the lens can be adjusted while the lens holder is moved.

Then, durability of the camera module can be improved by allowing the resilient portion formed in the absorber to absorb an impact concentrated on opposite ends of the wire spring while the lens holder is moved to adjust the focus of the lens.

The vertical wire absorbing structure of a compact camera module according to the present invention is not limited to the above-described embodiment, but may be variously deformed without departing from the spirit of the present invention.

The vertical wire absorbing structure of a compact camera module according to the present invention can prevent a camera module mounted to a portable terminal such as a mobile phone or a tablet PC to correct shaking of an image or automatically adjust a focus of a lens from being damaged by an impact which may occur while the portable terminal is used.

The invention claimed is:

1. A vertical wire absorbing structure of a compact camera module, comprising:
    a lens holder to which a camera lens is mounted;
    a spacer disposed on the lens holder;
    a flexible printed circuit board disposed on the spacer;
    a wire spring coupling the lens holder to the spacer such that the lens holder is horizontally moved with respect to the spacer; and
    an absorber disposed on or under the spacer, wherein the absorber absorbs an impact applied to the wire spring, and wherein the absorber is disposed between the spacer and the flexible printed circuit board, one end of the wire spring passes through the spacer and the absorber to be connected to the flexible printed circuit board and an opposite end of the wire spring is fixedly mounted to the lens holder, and coupling holes through which one end of the wire spring passes to be inserted into the coupling holes are formed in the spacer, the absorber, and the flexible printed circuit board.

2. The vertical wire absorbing structure of claim 1, wherein an insertion groove communicated with the coupling holes is formed at an upper portion of the spacer, and the absorber is inserted into the insertion groove.

3. The vertical wire absorbing structure of claim 2, wherein a metal terminal contacting the wire spring inserted into the coupling hole is formed in the flexible printed circuit board, and a maximum distance (L1) between the center of the coupling hole and the metal terminal is shorter than a minimum distance (L2) between the center of the coupling holes and the insertion groove.

4. The vertical wire absorbing structure of claim 2, wherein a thickness of the absorber is larger than or equal to a depth of the insertion groove.

5. The vertical wire absorbing structure of claim 1, wherein the absorber is formed of a polyurethane foam material.

6. The vertical wire absorbing structure of claim 1, wherein the spacer has a spacing portion concentric to the coupling hole and having a diameter larger than that of the coupling holes.

7. The vertical wire absorbing structure of claim 6, wherein a resilient portion resiliently deformed upwards and downward is formed at a circumference of the coupling hole of the absorber and the spacing portion is formed at a lower portion of the resilient portion such that the resilient portion is spaced apart from the spacer.

8. The vertical wire absorbing structure of claim 7, wherein a plurality of resilient portions are disposed to be spaced apart from each other about the coupling hole.

9. The vertical wire absorbing structure of claim 8, wherein a metal terminal contacting the wire spring inserted into the coupling holes is formed in the flexible printed circuit board, and a maximum distance (L3) between the center of the coupling holes and the metal terminal is shorter than a minimum distance (L4) between the center of the coupling holes and the insertion groove.

10. The vertical wire absorbing structure of claim 7, wherein a metal terminal contacting the wire spring inserted into the coupling holes is formed in the flexible printed circuit board, and a maximum distance (L3) between the center of the coupling holes and the metal terminal is shorter than a minimum distance (L4) between the center of the coupling holes and the insertion groove.

11. A compact camera module comprising:
a lens holder holding a lens;
a spacer disposed at one side of the lens holder;
an electrode plate fixed to the other side of the lens holder, the electrode plate including a resilient portion;
a flexible printed circuit board fixedly disposed on the spacer;
a wire spring one end portion of which is electrically connected to the flexible printed circuit and the other end portion of which is electrically connected to the resilient portion of the electrode plate so that the wire spring electrically connects the flexible printed circuit and the electrode plate to each other and vertically supports the lens holder, and the lens holder is vertically supported and horizontally moved with respect to the spacer.

12. The compact camera module of claim 11, wherein the resilient portion is formed of a resilient hole, a coupling piece formed inside the resilient hole, and a resilient pieces protruding from the coupling piece and connected to the electrode plate, the coupling piece having a fixing hole into which the wire spring is fixedly inserted.

13. The compact camera module of claim 11, wherein the wire spring passes through the spacer to be connected to the flexible printed circuit board and passes through the lens holder to be connected to the resilient portion of the electrode plate, a concave spacing groove is formed on a surface of the lens holder facing the resilient portion, and wherein the resilient portion absorbs an impact applied to the wire spring while being resiliently deformed toward the concave spacing groove.

14. The compact camera module of claim 11, wherein the electrode plate include a plurality of electrode plates spaced apart from each other by a connecting bar, cutaway portions are formed between each of the electrode plates and the connecting bar, and the cutaway portions are capable of being cut off to separate the connecting bar from the electrode plates.

15. The compact camera module of claim 14, wherein the connecting bar is branched into a plurality of parts and the electrode plates are connected to ends of the branched parts, respectively, and the widths of the cutaway portions become gradually narrower towards the electrode plates.

16. The compact camera module of claim 11, wherein the lens holder includes a coil for generating an electromagnet force, the coil being electrically connected to the electrode plate, and the spacer includes a magnet for generating an electromagnet field.

17. The compact camera module of claim 11, wherein the resilient portion includes a fixing hole into which the wire spring is fixedly inserted.

18. The compact camera module of claim 17, wherein the resilient portion further includes a coupling piece having the fixing hole.

19. The compact camera module of claim 18, wherein the resilient portion further includes a resilient piece extending from the coupling piece and connected to the electrode plate, the resilient piece being resiliently deformed when a vertical impact is applied to the wire spring.

20. A mobile terminal including a compact camera module, the compact camera module comprising:
a lens holder holding a lens;
a spacer disposed at one side of the lens holder;
an electrode plate fixed to the other side of the lens holder, the electrode plate including a resilient portion;
a flexible printed circuit board fixedly disposed on the spacer;
a wire spring one end portion of which is electrically connected to the flexible printed circuit and the other end portion of which is electrically connected to the resilient portion of the electrode plate so that the wire spring electrically connects the flexible printed circuit and the electrode plate to each other and vertically supports the lens holder, and the lens holder is vertically supported and horizontally moved with respect to the spacer.

21. The mobile terminal of claim 20, wherein the lens holder includes a coil for generating an electromagnet force, the coil being electrically connected to the electrode plate, and the spacer includes a magnet for generating an electromagnet field.

22. The mobile terminal of claim 20, wherein the resilient portion includes a fixing hole into which the wire spring is fixedly inserted.

23. The mobile terminal of claim 22, wherein the resilient portion further includes a coupling piece having the fixing hole.

24. The mobile terminal of claim 23, wherein the resilient portion further includes a resilient piece extending from the coupling piece and connected to the electrode plate, the resilient piece being resiliently deformed when a vertical impact is applied to the wire spring.

* * * * *